US010594999B2

(12) United States Patent
Stauder et al.

(10) Patent No.: US 10,594,999 B2
(45) Date of Patent: Mar. 17, 2020

(54) METHOD AND APPARATUS FOR CREATING A PAIR OF STEREOSCOPIC IMAGES USING LEAST ONE LIGHTFIELD CAMERA

(71) Applicant: THOMSON LICENSING, Issy les Moulineaux (FR)

(72) Inventors: Jurgen Stauder, Montreuil/Ille (FR); Benoit Vandame, Betton (FR); Cedric Thebault, Chantepie (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 197 days.

(21) Appl. No.: 15/631,009

(22) Filed: Jun. 23, 2017

(65) Prior Publication Data

US 2017/0374345 A1    Dec. 28, 2017

(30) Foreign Application Priority Data

Jun. 23, 2016    (EP) .................................... 16305760

(51) Int. Cl.
*G06T 15/06*    (2011.01)
*H04N 13/128*    (2018.01)
(Continued)

(52) U.S. Cl.
CPC ......... *H04N 13/128* (2018.05); *G06T 3/4015* (2013.01); *G06T 7/85* (2017.01);
(Continued)

(58) Field of Classification Search
CPC .. H04N 13/128; H04N 13/178; H04N 13/246; H04N 13/243; H04N 5/2258;
(Continued)

(56) References Cited

U.S. PATENT DOCUMENTS 6,483,534 B1 *  11/2002  d'Ursel .................... G02B 5/32
                                                          348/40
7,671,893 B2    3/2010   Li et al.
(Continued)

FOREIGN PATENT DOCUMENTS

JP    2003141527    5/2003
WO    WO9631047    10/1996

OTHER PUBLICATIONS

Mukati et al, Light Field Stitching for Extended Synthetic Aperture (Year: 2016).*

(Continued)

*Primary Examiner* — Shan E Elahi
(74) *Attorney, Agent, or Firm* — Patricia A. Verlangieri

(57) ABSTRACT

A method for creating a pair of stereoscopic images is described. The method includes using at least one lightfield camera which receives respective required camera parameters for a left view and a right view. The required camera parameters define a theoretical stereo image pair to acquire respective actual camera parameters for respective sub aperture images that are generated based on the captured image by the lightfield cameras, to determine a best matching sub aperture image for the left view by comparing the required camera parameter for the left view with the actual camera parameters for the respective sub aperture images, to determine a best matching sub aperture image for right view by comparing the required camera parameter for right view with the actual camera parameters for the respective sub aperture images, and to associate the best matching sub aperture image for left view and the best matching sub aperture image for right view as a pair of stereoscopic images.

12 Claims, 13 Drawing Sheets

(51) Int. Cl.
*H04N 13/282* (2018.01)
*G06T 7/80* (2017.01)
*G06T 3/40* (2006.01)
*G06T 15/20* (2011.01)

(52) U.S. Cl.
CPC ............ *G06T 15/06* (2013.01); *G06T 15/205* (2013.01); *H04N 13/282* (2018.05); *G06T 2207/10052* (2013.01); *G06T 2207/20228* (2013.01); *G06T 2207/30244* (2013.01); *G06T 2215/16* (2013.01)

(58) Field of Classification Search
CPC .. H04N 5/2254; H04N 13/282; G06T 3/4015; G06T 15/205; G06T 7/85; G06T 15/06; G06T 2215/16; G06T 2207/20228; G06T 2207/10052; G06T 2207/30244
USPC .......................................................... 348/46
See application file for complete search history.

(56) References Cited

U.S. PATENT DOCUMENTS

| | | | | |
|---|---|---|---|---|
| 9,094,675 | B2* | 7/2015 | Lukk | H04N 13/128 |
| 2005/0117215 | A1* | 6/2005 | Lange | G02B 27/22 |
| | | | | 359/462 |
| 2010/0103266 | A1* | 4/2010 | Merkel | G06T 7/80 |
| | | | | 348/155 |
| 2012/0176481 | A1* | 7/2012 | Lukk | H04N 13/128 |
| | | | | 348/47 |
| 2012/0194514 | A1* | 8/2012 | Sakaguchi | H04N 13/111 |
| | | | | 345/419 |
| 2013/0070108 | A1 | 3/2013 | Aerts et al. | |
| 2013/0120530 | A1* | 5/2013 | Hayashi | G03B 35/08 |
| | | | | 348/43 |
| 2013/0222555 | A1* | 8/2013 | Nagasaka | H04N 9/045 |
| | | | | 348/50 |
| 2015/0029345 | A1* | 1/2015 | Ikeda | H04N 17/002 |
| | | | | 348/187 |
| 2015/0042790 | A1 | 2/2015 | Hinderling et al. | |
| 2015/0317821 | A1* | 11/2015 | Ding | G06T 7/00 |
| | | | | 345/420 |
| 2016/0155230 | A1 | 6/2016 | Drazic et al. | |
| 2016/0307303 | A1* | 10/2016 | Ishigami | G06T 5/005 |
| 2016/0307372 | A1* | 10/2016 | Pitts | H04N 5/2254 |

OTHER PUBLICATIONS

Oliveira et al, Lenslet Light Field Panorama Creation: a Sub-Aperture Image Stitching Approach (Year: 2018).*
Kim et al., "Multi-camera Calibration Using Multi-view Constraints", 2011 17th Korea-Japan Joint Workshop on Frontiers of Computer Vision (FCV 2011), Ulsan, South Korea, Feb. 9, 2011, pp. 1-3.
Johannsen et al., "On the Calibration of Focused Plenoptic Cameras", LNCS 8200, Time-Of-Flight and Depth Imaging. Sensors, Algorithms and Applications, 2013, pp. 302-317.
Furukawa et al., "Accurate Camera Calibration from Multi-View Stereo and Bundle Adjustment", International Journal of Computer Vision, vol. 84, No. 3, Apr. 21, 2009, pp. 257-268.
McMillan et al., "Plenoptic Modeling: An Image-Based Rendering System", Proceedings of the 22nd Annual Conference on Computer Graphics and Interactive Techniques SIGGRAPH, Los Angeles, California, Aug. 6, 1995, pp. 39-46.
Ng et al., "Light Field Photography with a Hand-Held Plenoptic Camera", Stanford University, Computer Science Technical Report, Document CSTR Feb. 2005, Apr. 2005, pp. 1-11.
Reeve et al., "Basic Principles of Stereoscopic 3D", BskyB White paper, 2010, pp. 1-27.
Frank et al., "Robotics 2 Camera Calibration", Universität Freiburg, Fribourg, Switzerland, Nov. 26, 2010, pp. 1-40.
Carlsson, "Geometric Computing in image Analysis and Visualization", KTH Royal Institute of Technology, Stockholm, Sweden, Course 2D1428: Geometric Computing and Visualization Lecture Notes, Mar. 12, 2007, pp. 1-63.
Goorts et al. "Free Viewpoint Video for Soccer using Histogram-based Validity Maps in Plane Sweeping", 2014 International Conference on Computer Vision Theory and Applications, Lisbon, Portugal, Jan. 5, 2014, pp. 378-386.

* cited by examiner

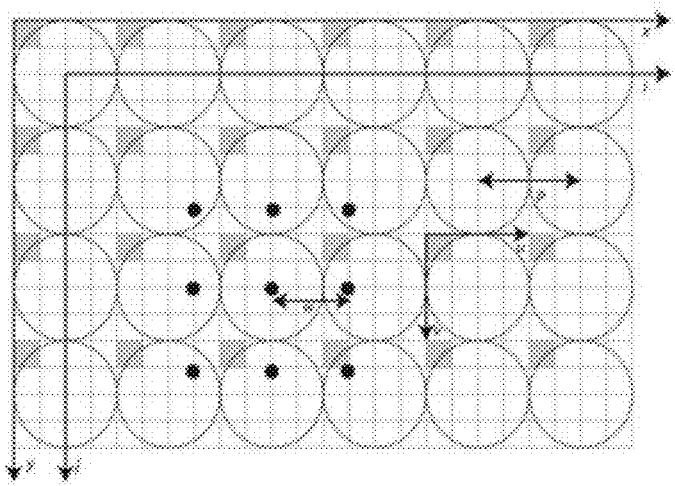
FIG.3-A
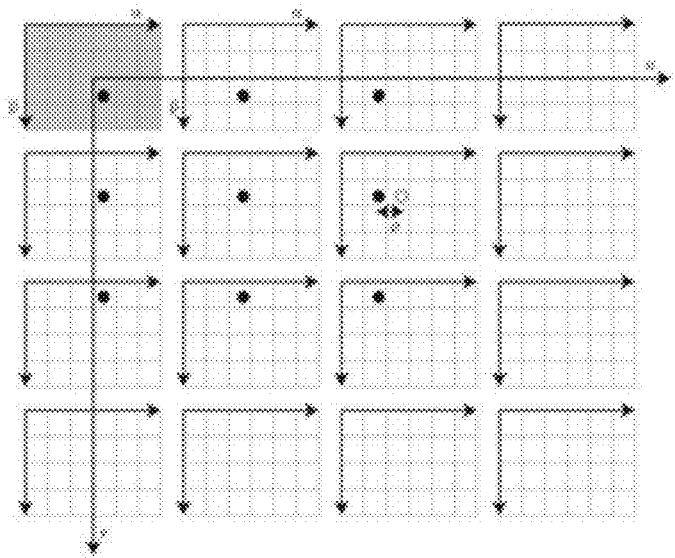
FIG.3-B

Sub aperture images
without correspondence

METHOD AND APPARATUS FOR CREATING A PAIR OF STEREOSCOPIC IMAGES USING LEAST ONE LIGHTFIELD CAMERA

REFERENCE TO RELATED EUROPEAN APPLICATION

This application claims priority from European Patent Application No. 16305760.7, entitled "A METHOD AND APPARATUS FOR CREATING A PAIR OF STEREOSCOPIC IMAGES USING LEAST ONE LIGHTFIELD CAMERA", filed on Jun. 23, 2016, the contents of which are hereby incorporated by reference in its entirety.

TECHNICAL FIELD

The present disclosure generally relates to the field of imaging, and more particularly to lightfield imaging techniques using plenoptic cameras.

BACKGROUND ART

This section is intended to introduce to the reader various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the framework of stereo (or multiple views) imaging, stereo (or multiple views) video contents need to be created, processed and reproduced on a 3D capable screen. Processing of stereo video contents allows the creation or enhancement of 3D information (for example disparity estimation). It also allows the enhancement of 2D images using 3D information (for example view interpolation).

Normally, stereo video contents are created from two (or more) captured 2D videos. 2D videos are videos in a classical sense having a temporal series of frames, each being a classical 2D image consisting of lines of pixels. Each pixel has a color, defined by color coordinates in a color space. Generally, a stereo imaging is multiple view imaging where more than two 2D videos are captured from the scene. Stereo imaging can also be generated in a synthetic manner from 3D models and computer graphics. In this way, animation can be created resulting in stereoscopic images and other related images having multiple views.

FIG. 1 shows a conventional process for creating multiple views. Several conventional 2D cameras 22 are shown which are fixed onto a rig output for creating raw image views 33. In one embodiment, a camera calibration module 44 performs camera calibration. This calibration provides an estimation of external and internal camera parameters based on the captured raw image views 33. Subsequently, the view generator module 55 generates calibrated views 66.

Each camera is defined by external and internal parameters. External parameters are expressed in the world-coordinate system and define the position and orientation of a camera. External parameters include a 3D rotation matrix R and a 3D translation vector t. Internal camera parameters include the focal length f and the coordinates $p_x, p_y$ of the principal point in the image plane.

For example, for a pin hole camera, a point in homogeneous scene-world-coordinates $X=(X\ Y\ Z\ 1)^T$ is projected onto an image position $x=(x\ y)^T$ according to $$x = PX$$

with P being the camera matrix according to $$P = K[R/Rt]$$

with R being a 3×3 rotation matrix, t being a 3D translation vector and with K being the camera calibration matrix defined according to $$K = \begin{pmatrix} f & & p \\ & f & p \\ & & 1 \end{pmatrix} \text{ with 2 parameters}$$

or $$K = \begin{pmatrix} f & & p_x \\ & f & p_y \\ & & 1 \end{pmatrix} \text{ with 3 parameters,}$$

or $$K = \begin{pmatrix} fx & & p_x \\ & fy & p_y \\ & & 1 \end{pmatrix} \text{ with 4 parameters.}$$

Camera calibration can be carried out, for example, using an object for calibration with known feature points at positions $(f_{X,i}\ f_{Y,i}\ f_{Z,i}\ 1)^T$ in homogeneous scene-world-coordinates and their projections into the image plane at positions with homogeneous coordinates $(f_{x,i}\ f_{y,i}\ 1)^T$. The camera parameters can be estimated according to the method described by Richard Hartley and Andrew Zissermann in their book entitled "Multiple view geometry in computer vision" published at Cambridge press on Mar. 24, 2004.

The next step of known processing in multiple view imaging is view rectification. Rectification is a necessary step to transform the views (two or more views) taken by cameras on a stereo rig to the views of which geometries are corrected. By performing rectification of the views, correcting the geometry of the views so that each view appears to be taken by cameras having a same image plane. However there are some limitations on the rectification. For example, vertical disparity cannot be corrected easily without a rotating the views, which is in most cases unacceptable. Vertical disparity appears for example in case the optical centers of the cameras are not horizontally aligned, i.e. have different vertical positions.

This problem related to vertical disparity is explained for example by Simon Reeve et al. in his presentation "Basic principles of stereoscopic 3D" as a white paper from BskyB on 2010. Vertical disparity is caused by cameras that do not have the same position or viewing direction in vertical direction. Even if rigs of stereo cameras are mechanically calibrated, a residual vertical misalignment often remains. Vertical misalignment creates problems in viewing stereo content.

SUMMARY

According to the present principles, a method for creating a pair of stereoscopic images using at least one lightfield camera, the method including: acquiring respective required camera parameter for a left view and a right view, wherein the required camera parameter define a theoretical stereo image pair; acquiring respective actual camera parameters for respective sub aperture images that are generated based on an image captured by the lightfield camera; determining a best matching sub aperture image for the left view by comparing the required camera parameter for the left view with the actual camera parameters for the respective sub aperture images and a best matching sub aperture image for the right view by comparing the required camera parameter for the right view with the actual camera parameters for the respective sub aperture images; and associating the best matching sub aperture image for the left view and the best matching sub aperture image for the right view as a stereo pair images.

The present principles also relate to a device for creating stereo pair images performing: acquiring respective required camera parameter for a left view and a right view, wherein the required camera parameter define a theoretical stereo image pair; acquiring respective actual camera parameters for respective sub aperture images that are generated based on an image captured by a lightfield camera; determining a best matching sub aperture image for the left view by comparing the required camera parameter for the left view with the actual camera parameters for the respective sub aperture images and a best matching sub aperture image for the right view by comparing the required camera parameter for the right view with the actual camera parameters for the respective sub aperture images; and associating the best matching sub aperture image for the left view and the best matching sub aperture image for the right view as a stereo pair images.

BRIEF DESCRIPTION OF THE DRAWINGS

FIG. 3A illustrates the conversion between the captured lightfield image and series of sub aperture images according to an embodiment of the present disclosure;

FIG. 3B illustrates the conversion between the captured lightfield image and series of sub aperture images according to an embodiment of the present disclosure;

DETAILED DESCRIPTION

Figure 1:
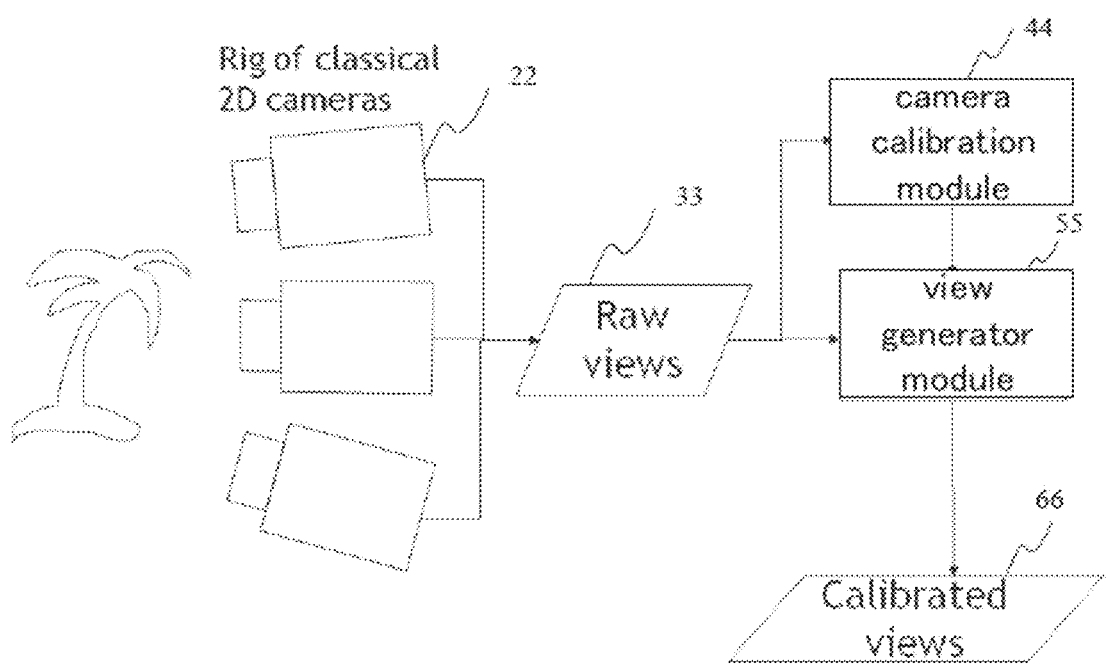
FIG. 1 shows processing of multiple view imaging in prior art.

In one embodiment of the present disclosure a method is provided to create a pair of stereoscopic images to overcome some of the calibration problems associated with the prior art, especially when multiple views are created by one or more plenoptic cameras (also called lightfield cameras interchangeably hereinafter). Lightfield cameras traditionally output a series of different sub aperture images for specific viewing directions. In calibration steps, respective camera parameters are estimated relating to sub aperture images (hereinafter, this parameter is referred as "actual camera parameters"). Subsequently, the actual camera parameters are compared to theoretical required camera parameter which present an ideal value for the stereoscopic image pairs (hereinafter, this parameter is referred to as "required camera parameter").

These required camera parameters that define an ideal or theoretical value for the stereo image pair also include an internal and/or external camera parameter(s). The required camera parameter may be prepared over a theoretical discussion around a table in a standardization body or may be averaged parameters for reference stereo cameras (for example in a production line of cameras). The required camera parameter describe what types of cameras are expected for creating a pair of stereoscopic images. For example, in a stereo imaging system the required camera parameter may include a certain distance between cameras, parallel viewing, a certain focal length and principal point being in the image center.

The values of required camera parameter may vary depending on requirements on the stereo pair images such as disparity and some other various requirements. The values of required camera parameter may also be altered depending on the settings or configurations of lightfield camera 1. As the requirements for stereo pair images change, the required camera parameter may be changed or updated. The required camera parameter may be acquired for example, from the source outside in advance and stored in the memory of the device for a comparison with the actual camera parameters.

In one embodiment, a methodology is provided as will be discussed that creates stereo pair images from sub aperture images coming from at least one or more lightfield cameras. Each lightfield camera outputs a series of sub aperture images. Respective sub aperture images have an individual viewing direction and being described by sub camera parameters (actual camera parameters).

Other than the present disclosure, the elements shown in the figures are well known and will not be described in detail. For example, other than the present disclosure, a device that is processor-based is well known and not described in detail herein. Some examples of processor-based devices are a mobile phone, table, digital still camera, laptop computer, desk top computer, digital television, etc. It should also be noted that the inventive concept may be implemented using conventional programming techniques, e.g., APIs (application programming interfaces) which, as such, will not be described herein. Finally, like-numbers on the figures represent similar elements.

Figure 2:
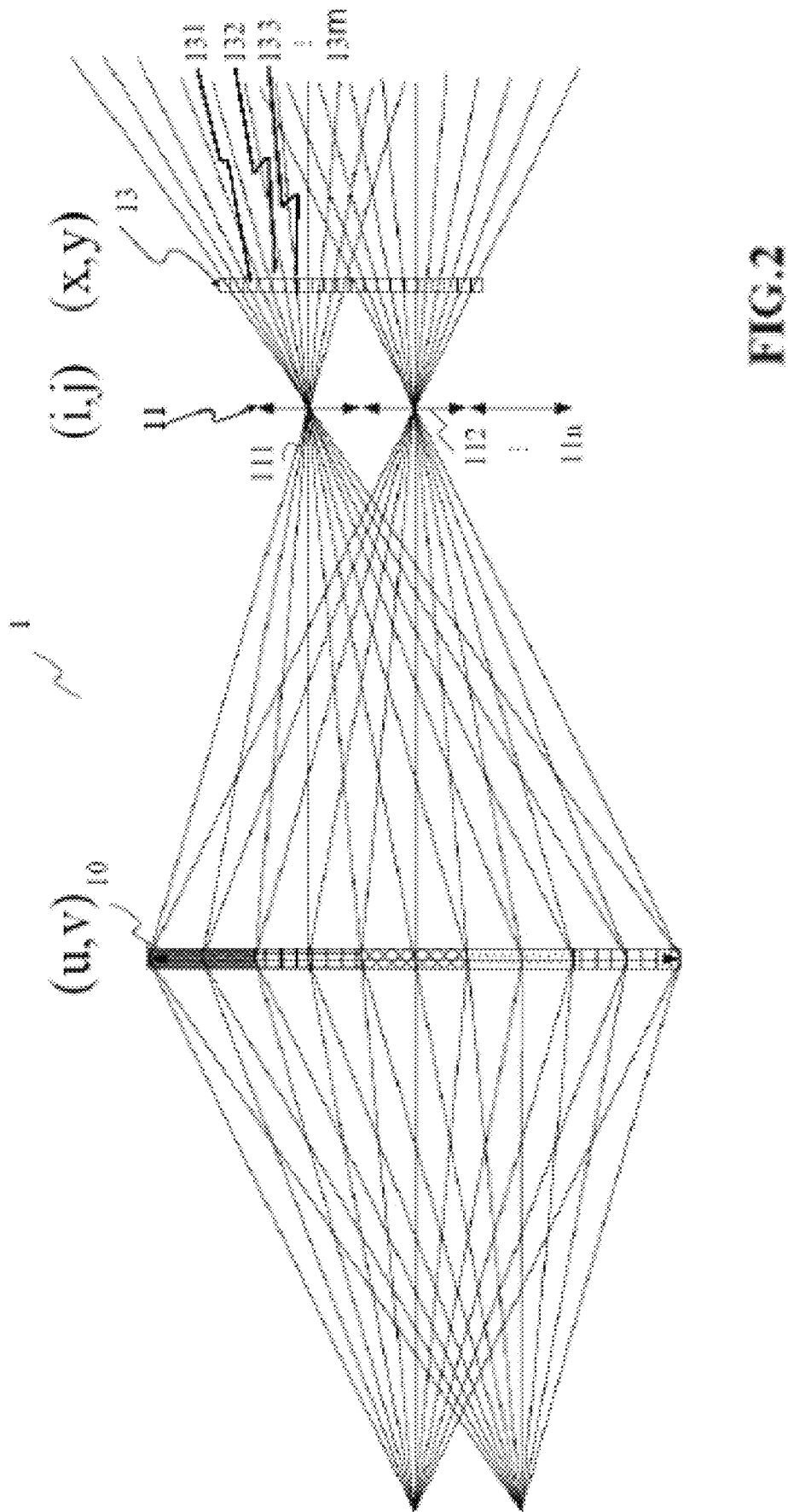
FIG. 2 illustrates a configuration for a lightfield camera according to an embodiment of the present disclosure.

FIG. 2 illustrates a configuration for a lightfield camera 5 according to an embodiment of the present disclosure. The lightfield camera 1 comprises a lens arrangement associated with an image sensor array 13. The image sensor array 13 comprises a large number m of pixels 131, 132, 133 to 13m arranged in the form of a grid of $N_x$ columns and $N_y$ lines, m corresponding to $N_x \times N_y$. The lens arrangement comprises a primary lens 10, also called main lens, and a lenslet array 11, which comprises a plurality of n microlenses 111, 112, 11n, n being a positive integer greater than or equal to 2. The microlenses 111, 112, 11n are arranged in such a way as to be optically each associated with a plurality of pixels. The number of p×p pixels optically associated with one microlens corresponds to the number of views of the scene acquired with the lightfield camera. In FIG. 2, each microlens 111,112,11n are referenced by (i,j), coordinate on a primary lens 10 is referenced by (u, v). A sensor array 13 records an image which is made of a collection of 2D small images arranged within a 2D image.

FIGS. 3A and 3B illustrate the conversion between the captured lightfield image and series of sub aperture images according to an embodiment of present disclosure. The captured lightfield image coordinates L(x, y, i, j) are converted into the series of sub aperture image S($\alpha$, $\beta$, u, v) where (u, v) identifies the sub aperture images coordinate, and ($\alpha$, $\beta$) are the pixel coordinate within the sub-aperture image of coordinate (u, v). The number of sub aperture images is equal to p×p. The number of microlenses 111, 112, 11n covering the sensor array 13 is referenced by (I,J). By definition $I=N_x/p$ and $J=N_y/p$. Axis of sub aperture image is labeled by ($\alpha$, $\beta$) such that ($\alpha$, $\beta$)$\in$[0,I/p[×[0,J/p[. The sub-apertures images are identified by the (u, v) coordinate which are defined such that: (u, v)$\in$[0,p [$^2$. To obtain the different sub aperture images, the raw image (i.e. the color sensor data acquired with the image sensor array 13) is demosaicked then de-multiplexed. After the demosaicking step, RGB image data values are obtained at each pixel location for each view. A sub aperture image collects all 4D lightfield pixels having the same (u, v) coordinates which are correlated with coordinates u and v on the primary lens 10, i.e. having the same viewing direction.

The de-multiplexing process comprises the reorganizing of the pixels of the raw image in such a way that all pixels capturing the light rays with a certain angle of incidence are stored in the same image creating the sub aperture images.

Figure 4:
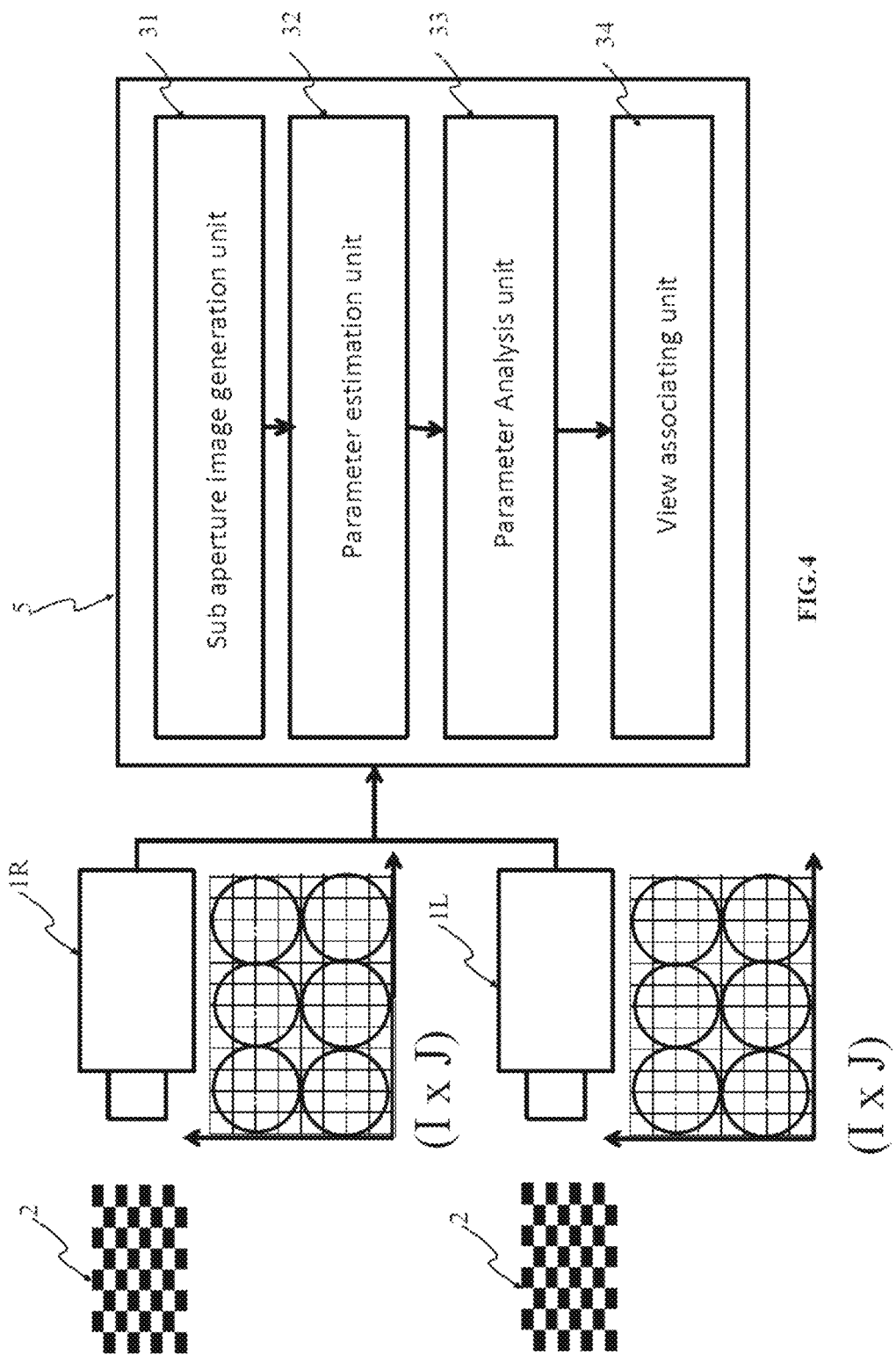
FIG. 4 shows a high level functional block diagram of a device, according to an embodiment of the present disclosure.

FIG. 4 shows a high level functional block diagram of a device, according to an embodiment of present disclosure. Only those portions relevant to the inventive concept are shown. As such, device 5 can perform other functions.

The system comprising at least one lightfield camera 1 and device 5. It would be understood by the person in the art that the functions depicted within device 5 can be implemented within lightfield camera 1 or separately implemented from lightfield camera 1. Although in FIG. 4 lightfield camera for left view 1L and lightfield camera for right view 1R are described, the implementations of present disclosure can be achieved by using single lightfield camera. In case using lightfield camera for left view 1L and lightfield camera for right view 1R, those lightfield cameras 1L and 1R need to be fixed onto the rig to capture the relative images. For estimating actual camera parameters for each sub aperture images, Lightfield camera 1 captures an object 2 which may be an object with known size or geometry such as checkerboard pattern. Needless to say, other objects for calibration of which features have known size or geometry can be used. The corners of the black and white square of the object (such as checkerboard pattern) 2 are detected in pixel coordinates ($\alpha$, $\beta$) of the sub aperture image S($\alpha$, $\beta$, u, v).

Based on homogeneous scene-world-coordinates of feature points of an object 2 and corresponding pixel coordinates in sub aperture image S($\alpha$, $\beta$, u, v), it is possible for parameter estimation unit 32 to compute the rotation matrix R and translation vector t using least squares estimation. Estimating rotation matrix R and translation vector t using well known checkerboard pattern is explained in the document "Robotics 2 Camera Calibration" by Barbara Frank, Cyrill Stachniss, Giorgio Grisetti, Kai Arras, Wolfram Burgard. According to the present disclosure "actual camera parameters" means camera parameters (rotation matrix R and translation vector t) for a sub aperture image computed based on "actually captured" image of object 2 by the lightfield camera 1 and above mentioned corresponding homogeneous scene-world-coordinates of feature points of an object 2.

After lightfield camera 1 captures the image of object 2, this captured image is sent to sub aperture image generation unit 31, then raw images are demosaicked and de-multiplexed by sub aperture image generation unit 31. In case there are arrays of i×j microlenses 111, 112, 11n and the number of p×p pixels optically associated with one microlens, p×p sub aperture images are created from each lightfield camera 1.

Parameter estimation unit 32 is for computing R matrix and t translation vector for respective sub aperture images de-multiplexed by sub aperture image generation unit 31. As described above, parameter estimation unit 32 computes rotation matrix R and translation vector t for respective sub aperture images based on the correspondence between known scene-world-coordinates of known feature points of object 2 and pixel coordinates of the known feature points in sub aperture image S($\alpha$, $\beta$, u, v). For example, if the calibration matrix K is known, the rotation matrix R and the translation vector t can be determined for each sub-aperture image using the method for example described in "Robotics 2 Camera Calibration" by Barbara Frank et al. In another example, in case a lightfield camera is made of a microlenses covering 3×3 pixels (p=3), a total of 9 sub-aperture images are extracted.

Parameter estimation unit 32 estimates for each of the sup-aperture image in total 8 to 10 (for example, 3 parameters for t, 3 for R and 2 or 3 or 4 parameters for K) parameters of $R_{uv}$,$t_{uv}$ and $K_{uv}$ (R, t and K stand for rotation matrix, translation vector and calibration matrix, respectively, for each sub aperture images) for 3×3 in total 9 sub aperture images (u, v)$\in$[0, p[$^2$. In case using left 1L and right 1R lightfield camera pairs each having 3×3 pixels per microlens thus 3×3 sub aperture images (u, v)$\in$[0,p[$^2$, parameter estimation unit 32 estimates in total 18 sets of camera parameters. 9 sets of Act$R_{L,uv}$, $t_{L,uv}$, $K_{L,uv}$, (respective camera parameters for respective sub aperture images captured by lightfield camera for left view 1L) and 9 sets of Act$R_{R,uv}$,$t_{R,uv}$, $K_{R,uv}$ (respective camera parameters for respective sub aperture images captured by lightfield camera for right view 1R). Parameter estimation unit 32 estimates actual camera parameters according to the known method as stated previously. It would be understood that sets of actual camera parameters may be estimated with the several different approaches.

Parameter analysis unit 33 is responsible for finding the best matching sub aperture images by comparing respective actual camera parameters with the required camera parameter. Parameter analysis unit 33 compares calculated respective actual camera parameters (for example, rotation matrix R and translation vector t) for respective sub aperture images with a required camera parameter comprising R matrix and t to find the best match. Parameter analysis unit 33 searches from $ActR_{uv}, t_{uv}$ in case of 1 lightfield camera. For a left and right lightfield camera pair 1L and 1R, parameter analysis unit 33 compares $Req\_R_L t_L$ (required camera parameter for left view) with $ActR_{L,uv} t_{L,uv}$ with $(u, v) \in [0, p[^2$ of sub aperture images captured by lightfield camera for left view 1L and compares $Req\_R_R, t_R$ (required camera parameter for right view) with $ActR_{R,uv} t_{R,uv}$ with $(u, v) \in [0, p[^2$ of sub aperture images captured by lightfield camera for right view 1R. In case there is no exactly matching sub aperture image, parameter analysis unit 33 may determine that the sub aperture image of which actual camera parameter is the closest to the required camera parameter is the best matching sub aperture image. For all sub aperture images, parameter analysis unit 33 may determine whether the difference between sub aperture image's actual camera parameter and required camera parameter is within the threshold. If there is no sub aperture image of which actual camera parameters' difference from the required camera parameter is within the threshold, parameter analysis unit 33 may return the result as "No matching sub aperture image found". There may be a case that parameter analysis unit 33 may find several sub aperture images having actual camera parameter of which value is different from the required camera parameter less than the threshold value. Parameter analysis unit 33 may determine that sub aperture image of which actual camera parameter is the closest to the required camera parameter is the best matching sub aperture image. Other matching methods could be used, such as projecting predefined 3D positions onto 2D positions then evaluating differences in 2D positions. Other matching methods could be the re-projection of predefined 2D positions onto 3D positions and evaluating differences in 3D positions.

The View associating unit 34 is used for associating respective sub aperture images based on the result of comparison provided by parameter Analysis unit 33. The associating steps are well described in FIG. 5 to 7 and following description.

Figure 5:
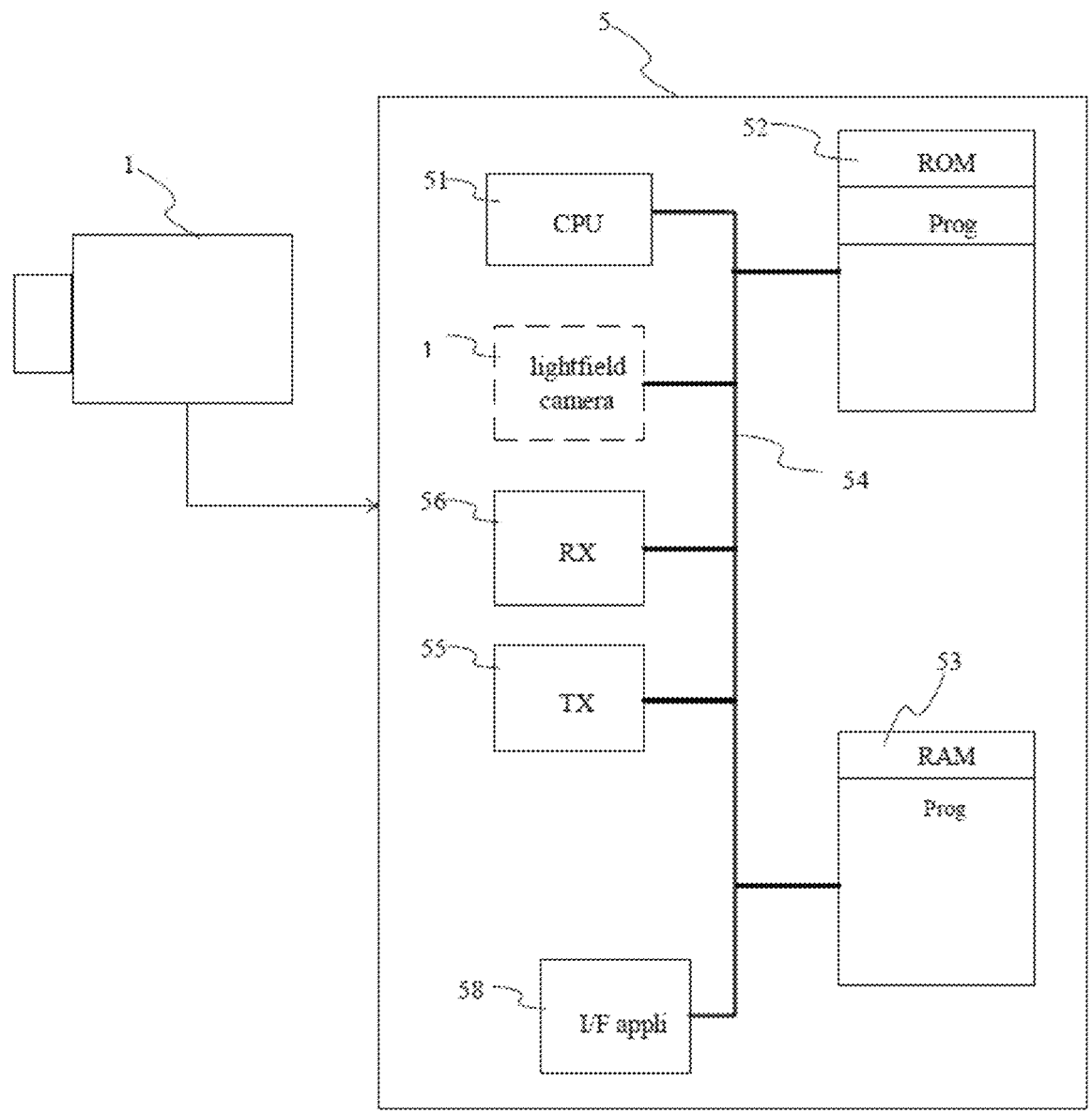
FIG. 5 illustrates a block diagram illustrating hardware configuration of a device according to an embodiment of present disclosure.

FIG. 5 illustrates a block diagram illustrating hardware configuration of a device according to an embodiment of present disclosure. Although as it is illustrated in FIG. 5 device 5 includes lightfield camera 1, lightfield camera 1 can be configured separately from a device 5. A device 5 can be any devise such as, for example, smartphones, smartwatches, tablets, computers, mobile phones, portable/personal digital assistants ("PDAs"), and other devices that facilitate communication of information between end-users but also lightfield camera 1.

The device 5 comprises the following elements, connected to each other by a bus 54 of addresses and data that also transports a clock signal, a processor 51 (or CPU), a non-volatile memory of ROM (Read Only Memory) type 52, a Random Access Memory or RAM 53, a radio interface 56, an interface 55 adapted for the transmission of data, a lightfield camera 1, an MMI (Man Machine Interface) 58 adapted for displaying information for a user and/or inputting data or parameters.

It is noted that the word "register" or "store" used in the description of memories 52 and 53 designates in each of the memories mentioned, a memory zone of low capacity as well as a memory zone of large capacity (enabling a whole program to be stored or all or part of the data representing data received and decoded).

The ROM 52 comprises in particular a program "prog". The algorithms implementing the steps of the method specific to the present disclosure and described below are stored in the ROM 52 memory associated with the device 5 implementing these steps. When powered up, the processor 51 loads and runs the instructions of these algorithms.

The RAM 53 notably comprises in a register, the operating program of the processor 51 responsible for switching on the device 5, reception parameters (for example parameters for modulation, encoding, MIMO, recurrence of frames), transmission parameters (for example parameters for modulation, encoding, MIMO, recurrence of frames), incoming data corresponding to the data received and decoded by the radio interface 56, decoded data formed to be transmitted at the interface to the application 58, parameters of the primary lens 10 and/or information representative of the centers of the micro-images formed by the microlenses of the microlens array.

Other structures of the device 5 than those described with respect to FIG. 5 are compatible with the present disclosure. In particular, according to variants, the device 5 may be implemented according to a purely hardware realization, for example in the form of a dedicated component (for example in an ASIC (Application Specific Integrated Circuit) or FPGA (Field-Programmable Gate Array) or VLSI (Very Large Scale Integration) or of several electronic components embedded in an apparatus or even in a form of a mix of hardware elements and software elements.

The radio interface 56 and the interface 55 are adapted for the reception and transmission of signals according to one or several telecommunication standards such as IEEE 802.11 (Wi-Fi), standards compliant with the IMT-2000 specifications (also called 3G), with 3GPP LTE (also called 4G), IEEE 802.15.1 (also called Bluetooth).

According to a variant, the device 5 does not include any ROM but only RAM, the algorithms implementing the steps of the method specific to the present disclosure being stored in the RAM.

Figure 6:
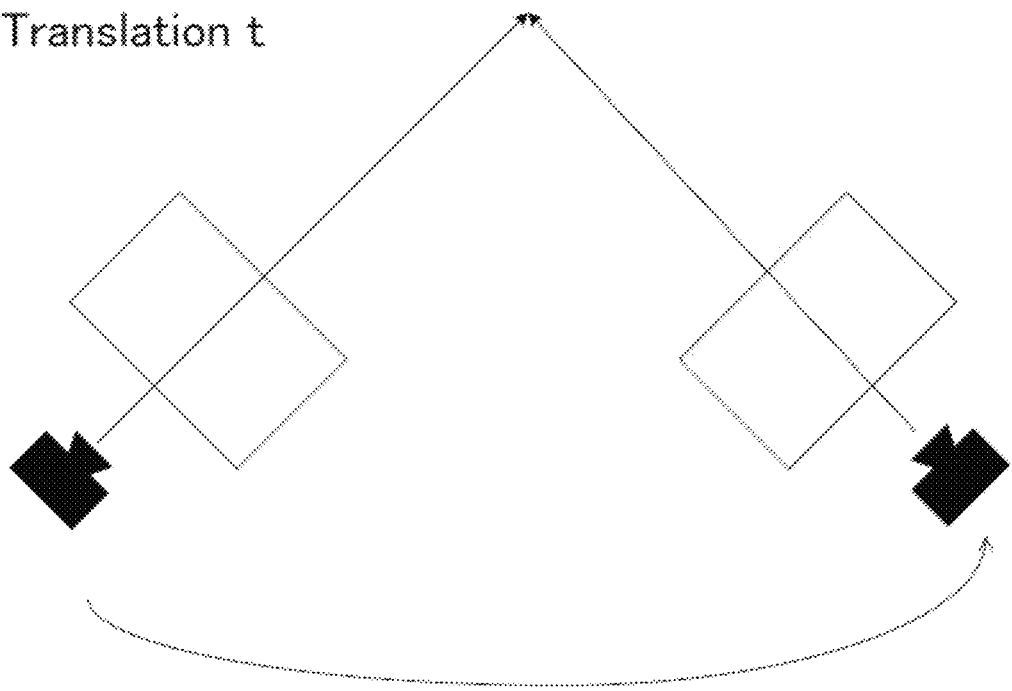
FIG. 6 illustrates an example of required camera parameters including a rotation matrix R parameter and a translation vector t parameter, according to an embodiment of the present disclosure.

FIG. 6 shows an example of required camera parameters including a rotation matrix R parameter and a translation vector t parameter which defines a theoretical stereo image pair, according to an embodiment of the present disclosure. The required camera parameter in this case comprises a set of parameters rotation matrix R and translation vector t according to an embodiment of present disclosure. A pairs of required camera parameter for left view and right view is prepared and stored in the memory. Required camera parameter for left view 41 is indicated as $Req\_R_L t_L$, whereas required camera parameter for right view 42 is indicated as $Req\_R_R t_R$.

First Embodiment

A preferred embodiment of the first aspect of the present invention relates to the case where two lightfield cameras (1L and 1R) are being used for creating stereo pair.

Figure 7:
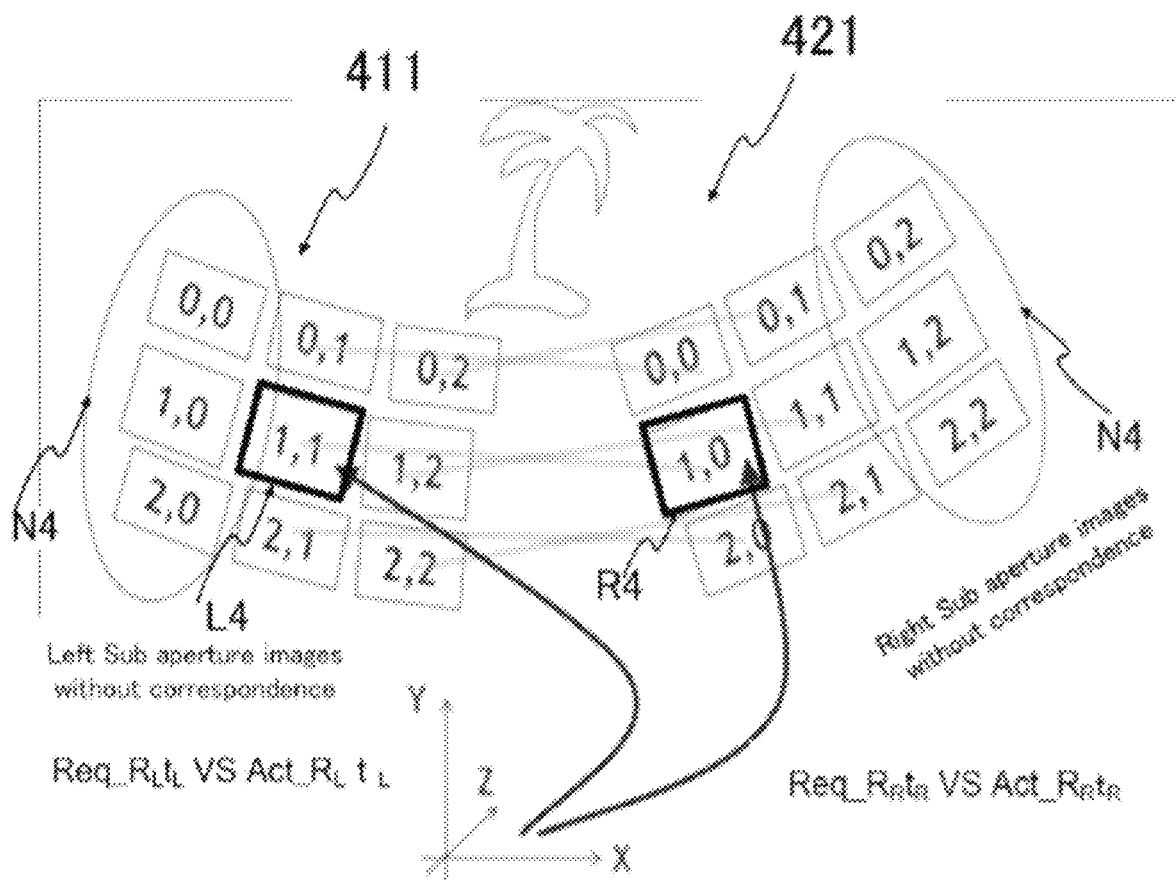
FIG. 7 illustrates the association of sub aperture images based on the comparison between required camera parameters and actual camera parameters according to an embodiment of the present disclosure.

FIG. 7 shows the association of sub aperture images based on the comparison between required camera parameters and actual camera parameters according to an embodiment of the present disclosure. Actual camera parameters for respective sub aperture images for left view 411 and actual camera parameters for respective sub aperture images for right view 421 are estimated. In this example, 3×3 in total 9 sub-aperture images are generated so that 9 sets of actual camera parameters for respective left and right sub aperture images are estimated. In this figure, actual camera parameters for sub aperture images for left view 411 is indicated as Act_$R_L t_L$, whereas the actual camera parameters for sub aperture image for right view 421 is indicated as Act_$R_R t_R$. Required camera parameter for left view 41 (Req_$R_L t_L$) may be compared with respective actual camera parameters for sub aperture images for left view 411 (Act_$R_L t_L$). A required camera parameter for right view 42 (Req_$R_R t_R$) may be compared with respective actual camera parameters for sub aperture images for right view 421 (Act_$R_R t_R$). Comparison for example is a calculation of distance between matrices of Req_$R_L t_L$ and Act_$R_L t_L$ or a distance between matrices of Req_$R_R t_R$ and Act_$R_R t_R$.

In this exemplary embodiment, parameter analysis unit 33 may determine that actual camera parameter of central sub aperture image (u, v)=(1,1) Act$R_{L,1,1} t_{L,1,1}$ L4 in FIG. 7 is the closest to a required camera parameter for left view 41 (Req_$R_L t_L$) (among all actual camera parameters of sub aperture images for left view 411). In that case, parameter analysis unit 33 may determine that central sub aperture image (u, v)=(1,1) L4 in FIG. 7 is the best matching sub aperture image for left view 411.

Parameter analysis unit 33 may also determines that actual camera parameter of sub aperture image of middle at left end (u, v)=(1,0) Act_$R_{R.1.0} t_{R.1.0}$ R4 in FIG. 7 is the closest to a required camera parameter for right view 42 (Req_$R_R t_R$) (among all actual camera parameters for sub aperture images for right view 421). In that case, Parameter analysis unit 33 may determine that sub aperture image of middle at left end (u, v)=(1,0) R4 in FIG. 7 is the best matching sub aperture image for right view 421.

A view associating unit 34 associates the best matching sub aperture image for the left view (L4 in FIG. 7) to the best matching sub aperture image for right view (R4 in FIG. 7). As indicated in FIG. 7, view associating unit 34 associate remaining sub aperture image for left view with the remaining sub aperture image for right view. In this disclosure, "remaining sub aperture image(s)" refers to the respective sub aperture images other than the best matching sub aperture images. In one exemplary embodiment, as depicted in FIG. 7, view associating unit 34 can associate respective sub aperture images for left view with respective sub aperture images for right view that is in the relatively same position from the best matching sub aperture images (L4 or R4 in FIG. 7). Detailed step of associating respective remaining sub aperture image for left view with the respective remaining sub aperture image for right view are described in later section in this description.

As illustrated in FIG. 7, some sub aperture images (N4 in FIG. 7) cannot be associated with the other view of sub aperture images, those sub aperture images may be ignored or recorded as no matching views. A view associating unit 34 stores its association results to a memory.

Figure 8:
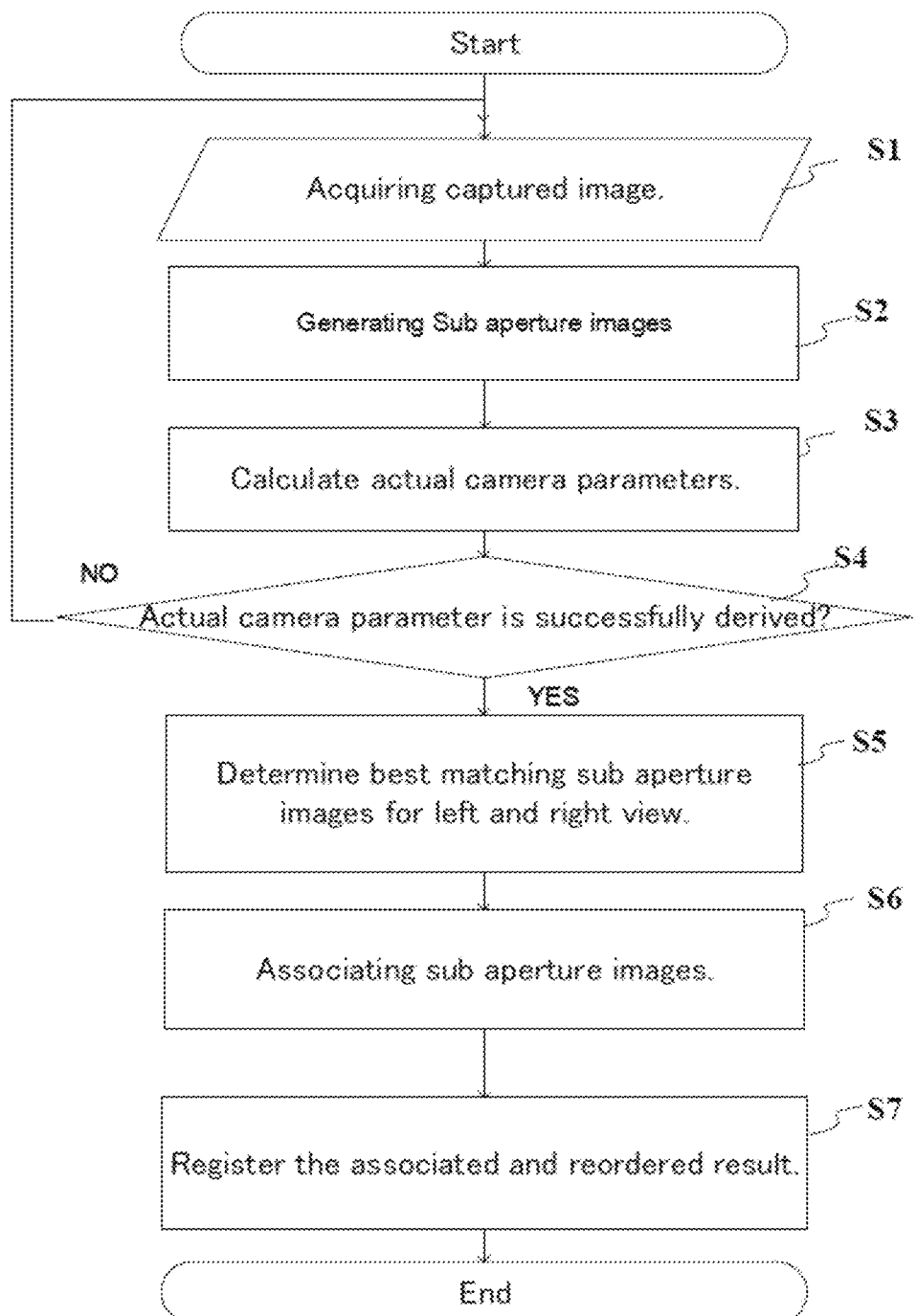
FIG. 8 illustrates a flow chart illustration for performing steps of calculating actual camera parameters and associating sub aperture images according to an embodiment of the present disclosure.

FIG. 8 shows an illustrative flow chart for performing steps of calculating actual camera parameters and associating sub aperture images according to an embodiment of present disclosure. In this exemplary flowchart it is explained in accordance with a setup that two lightfield cameras 1L and 1R are being used, however needless to say these steps can be performed using single lightfield camera.

At step S1, lightfield camera 1L and 1R capture an image of object 2 within a scene which is placed in front of lightfield camera 1L and 1R. An object 2 may be disposed at the predetermined position in order to set properly or measure the world-coordinates of the object 2 in the scene. In this step or in a following step, scene-world-coordinates of respective feature points of the object 2 may be acquired. Scene-world-coordinates of respective feature points of the object 2 may be acquired with such as Time-of-Flight (ToF) cameras, stereo triangulation, or some other known method in the art. Scene-world-coordinates of respective feature points of the object 2 may also be input or registered by a user and preregistered in the system. Captured image signal and acquired scene-world-coordinates of respective feature points of the object 2 may be sent to device 5. Needless to say, lightfield camera 1L and 1R are set mechanically in the stereo rig so that each view appears to be taken by cameras having almost the same image plane. The imperfection in aligning the two cameras is addressed by the proposed disclosure.

At step S2, sub aperture image generation unit 31 generates sub aperture images from the acquired image at step S1. As explained in above this and following steps may be performed either by lightfield camera 1 or device 5. In case the device 5 outside of the lightfield camera 1 performs these steps, captured image signal may be sent to the device 5 via communication network interface. In case all steps are performed in lightfield camera 1, captured image signal may be demosaicked then de-multiplexed in lightfield camera 1.

At step S3, parameter estimation unit 32 estimates respective actual camera parameters for respective sub aperture images. As stated above, parameter estimation unit 32 estimates actual camera parameters using known method explained previous section. For example, parameter estimation unit 32 estimates an actual camera parameters for sub aperture image (u,v)=(0,0), based on the pixel coordinates of respective feature points in sub aperture image $S_i(\alpha_i, \beta_i, 0, 0)$ and scene-world-coordinates of corresponding feature points $(X_i, Y_i, Z_i)$ (i can be a positive integer such as i=1 . . . n). Suppose that the pixel coordinates of respective feature points set in an image is $\alpha_1, \beta_1 \ldots \alpha_n, \beta_n$, the corresponding scene-world-coordinates may be denoted $X_1, Y_1, Z_1 \ldots X_n, Y_n, Z_n$. $[\alpha_i, \beta_i, 1] = P[Xi, Yi, Zi, 1]$ The steps for computation of the actual camera parameters can be automated after receiving an initiation signal (for example, received by pressing start button (not presented in the figure) such as "start calculating actual camera parameters", or initiation command) after placing the object 2 in front of lightfield cameras. Once the initiation signal or command for computation of the actual camera parameters is given, the step S1 to S3 may be repeatedly performed till it will be determined at step S4 that the actual camera parameters are successfully derived.

Once actual camera parameters for respective sub aperture images are derived, the process moves to step S5. At step S5, parameter Analysis unit 33 determines the best matching sub aperture images. At step S5, parameter Analysis unit 33 access required camera parameter (Req_$R_L t_L$ for left view 41 and Req_$R_R t_R$ for right view 42) that are stored in a memory or specified by user, then compare the required camera parameter (Req_$R_L t_L$ or Req_$R_R t_R$) with the respective actual camera parameters for respective the sub aperture images. In case two lightfield cameras 1L and 1R are used, Parameter analysis unit 33 compares the required camera parameter for left view 41 (Req_$R_L t_L$) with the respective actual camera parameters for respective sub aperture images for left view 411 (Act_$R_L t_L$), also compares the required camera parameter for right view 42 (Req_$R_R t_R$) with the respective actual camera parameters for sub aperture images for right view 421 (Act_$R_R t_R$).

At step S6, the view associating unit 34 associates sub aperture images for left view with the respective sub aperture images for right view. This step will be described elaborately in later section of this description in reference with FIG. 9.

At step S7, view associating unit 34 will register association results to a memory.

Figure 9:
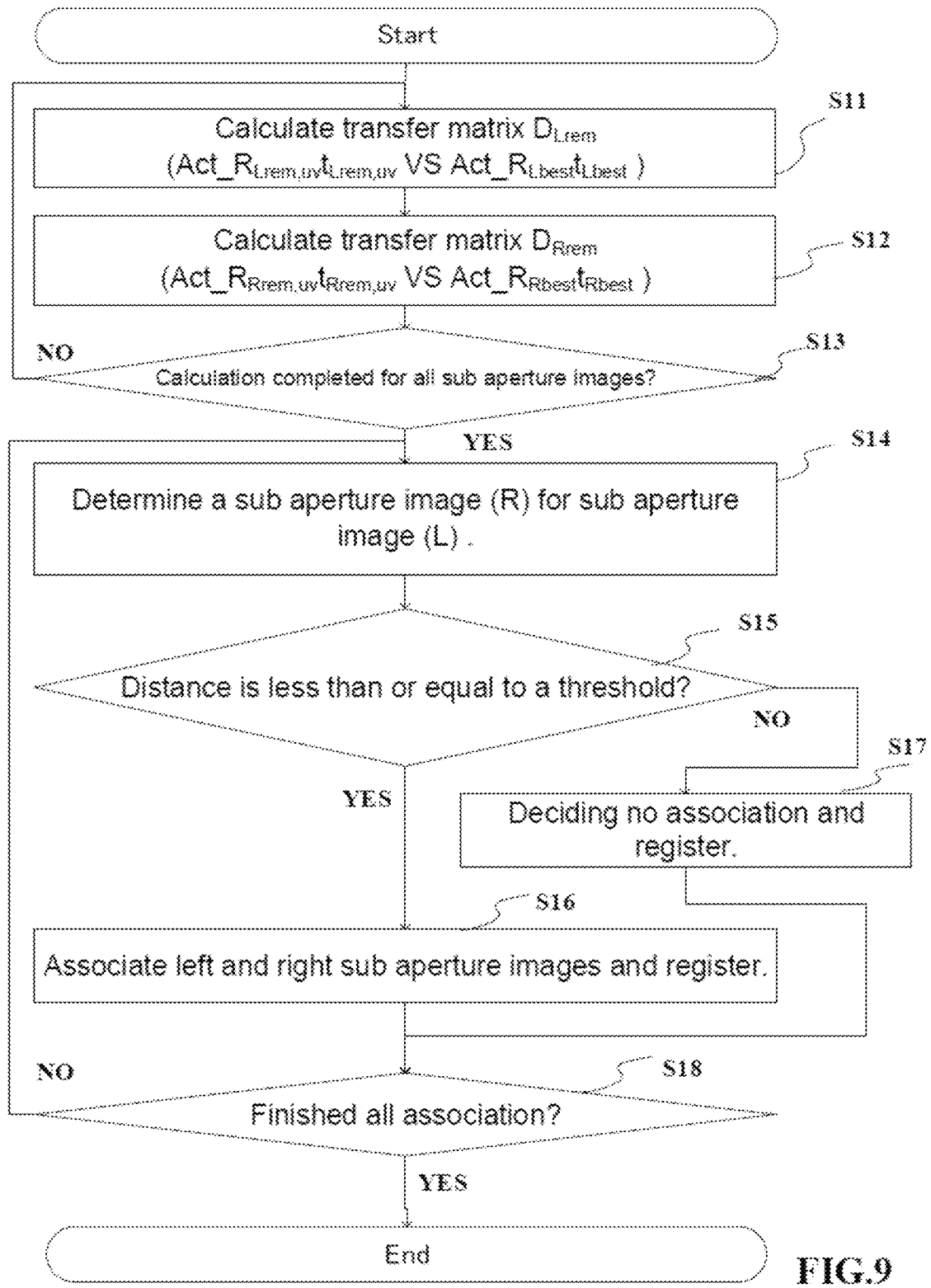
FIG. 9 shows a flow chart illustration for association of the remaining sub aperture image for left view with the remaining sub aperture image for right view according to an embodiment of the present disclosure.

FIG. 9 shows a flow chart illustration for association of the remaining sub aperture image for left view with the remaining sub aperture image for right view according to an embodiment of the present disclosure. Although it is being explained in accordance with the case where 2 lightfield cameras 1L and 1R are used, these steps can be performed in the case where single lightfield camera is used.

At step S11 for (u, v)-th remaining sub aperture image for left view, view associating unit 34 calculates transfer matrix $D_{Lrem,uv}$ that is able to transfer the actual camera parameter $Act\_R_{Lrem,uv}t_{Lrem,uv}$ into the actual camera parameter $Act\_R_{Lbest}t_{Lbest}$ of the above mentioned best matching sub aperture image for left view. The transfer matrix can be calculated for example by the following formula:

$$D_{Lrem}=(R_{LDrem}|t_{LDrem})=(R_{Lem}^{-1}R_{Lbest}|R_{Lrem}^{-1}(t_{Lbest}-t_{Lrem})).$$

In step S11, the view associating unit 34 calculates the transfer matrix $D_{Lrem,uv}$ from actual camera parameter $Act\_R_{Lrem,uv}t_{Lrem,uv}$ of (u, v)-th remaining sub aperture image for left view and actual camera parameter $Act\_R_{Lbest}t_{Lbest}$ of the above mentioned best matching sub aperture image for left view.

In step S12, for (u, v)-th remaining sub aperture image for right view, view associating unit 34 calculates the transfer matrix $D_{Rrem,uv}$ that is able to transfer the actual camera parameter $Act\_R_{Rrem,uv}t_{Rrem,uv}$ into the actual camera parameter $Act\_R_{Rbest}t_{Rbest}$ of the above mentioned best matching sub aperture image for right view. The transfer matrix can be calculated for example by the following formula:

$$D_{Rrem}=(R_{RDrem}|t_{RDrem})=(R_{Rrem}^{-1}R_{Rbest}|R_{Rrem}^{-1}(t_{Rbest}-t_{Rrem})).$$

In step S12, view associating unit 34 calculates the transfer matrix from the actual camera parameter $Act\_R_{Rrem,uv}t_{Rrem,uv}$ of (u, v)-th remaining right sub aperture image for right view and the actual camera parameter $Act\_R_{Rbest}t_{Rbest}$ of the above mentioned best matching sub aperture image for right view.

In step S13, it is determined whether all the $D_{Lrem}$ for all remaining sub aperture image for left view and all the $D_{Rrem}$ for all remaining sub aperture image for right view are calculated. The step S11 and step S12 are repeated until all the $D_{Lrem}$ for all remaining sub aperture image for left view and all the $D_{Rrem}$ for all remaining sub aperture image for right view are calculated. In case where lightfield camera 1L and 1R can produce 9 sets of sub aperture images, 8 sets of $D_{Lrem}$ and $D_{Rrem}$ may be calculated. If it is determined that all the $D_{Lrem}$ for all remaining sub aperture image for left view and all the $D_{Rrem}$ for all remaining sub aperture image for right view are not calculated, process go back to step S11.

In step S14 view associating unit 34 determine a remaining sub aperture image for right view of which $D_{Rrem}$ is the closest (or most similar) to a $D_{Lrem}$ of remaining sub aperture image for left view. For example, view associating unit 34 calculate a distance between $D_{Lrem}$ (for (u, v)-th) and respective $D_{Rrem}$ of all remaining sub aperture image for right view and determines a remaining sub aperture image for right view of which $D_{Rrem}$ is the closest to the $D_{Lrem}$ (for (u, v)-th).

The distance between $D_{Rrem}$ and $D_{Lrem}$ can be calculated using the following formula:

$$D_{Rrem}-D_{Lrem}=(R_{LDrem}^{-1}R_{RDrem}|t_{RDrem}-t_{LDrem}).$$

In step S15, view associating unit 34 determine the distance between the $D_{Lrem}$ of (u, v)-th remaining sub aperture image for left view and $D_{Rrem}$ of determined remaining sub aperture image for right view is less than or equal to a threshold value. If it is determined that distance between $D_{Lrem}$ of (u, v)-th remaining sub aperture image for left view and $D_{Rrem}$ that is closest to a $D_{Lrem}$ of (u, v)-th remaining sub aperture image for left view is not less than or equal to the threshold, process proceeds to step S17, otherwise, proceeds to step S16.

In a case where the view associating unit 34 determines that distance is not less than or equal to the threshold value, at step S17, view associating unit 34 determine that there is no remaining sub aperture image for right view which can be associated to (u, v)-th remaining sub aperture image for left view and register its result (no association) to a memory.

In step S16, in a case where the view associating unit 34 determine that distance between $D_{Lrem}$ of (u, v)-th and $D_{Rrem}$ (closest to $D_{Lrem}$ of (u, v)-th) is less than or equal to the threshold value, view associating unit 34 associate (u, v)-th remaining sub aperture image for left view with a remaining sub aperture image for right view of which $D_{Rrem}$ is the closest to $D_{Lrem}$ of (u, v)-th remaining sub aperture image for left view.

In step S18, the view associating unit 34 determines whether association for all remaining sub aperture image for left view are completed. If it is determined that all the calculation and association is completed, process will be terminated. Otherwise it will go back to step S14 to repeat the steps for association for next (u, v)-th remaining left sub aperture image for left view.

Figure 10:
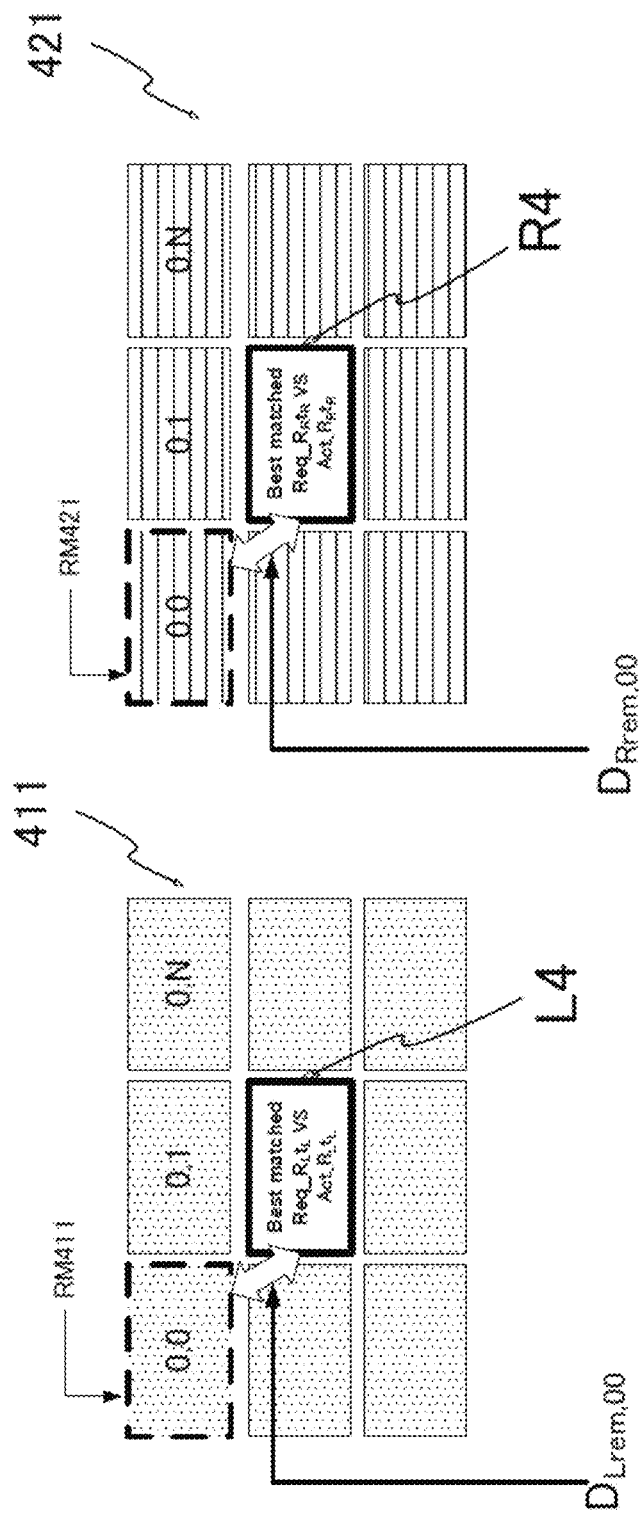
FIG. 10 shows association of remaining sub aperture image for left view with remaining sub aperture image for right view in case 2 lightfield cameras are used according to an embodiment of present disclosure.

FIG. 10 shows association of remaining sub aperture image for left view with remaining sub aperture image for right view in case 2 lightfield cameras are used according to an embodiment of present disclosure. Respective remaining sub aperture image for left view RM411 or right view RM421 may be associated in accordance with the respective distances from the best sub aperture images for left view 411 or for right view 421. In FIG. 10, remaining sub aperture image for left view RM411 are denoted with dot fill type, while remaining sub aperture image for right view RM421 are denoted with border fill type. A remaining sub aperture image for left view RM411 may be associated with a remaining sub aperture image for right view RM421 of which the transfer matrix ($D_{Rrem}$) is the closest to the transfer matrix ($D_{Lrem}$) of the remaining sub aperture image for left view RM411.

Second Embodiment

A preferred embodiment of the second aspect of the present invention relates to the case where single lightfield camera is being used for creating stereo pair. Duplicated description of the arrangements and process described in the first embodiment will be omitted here.

Figure 11:
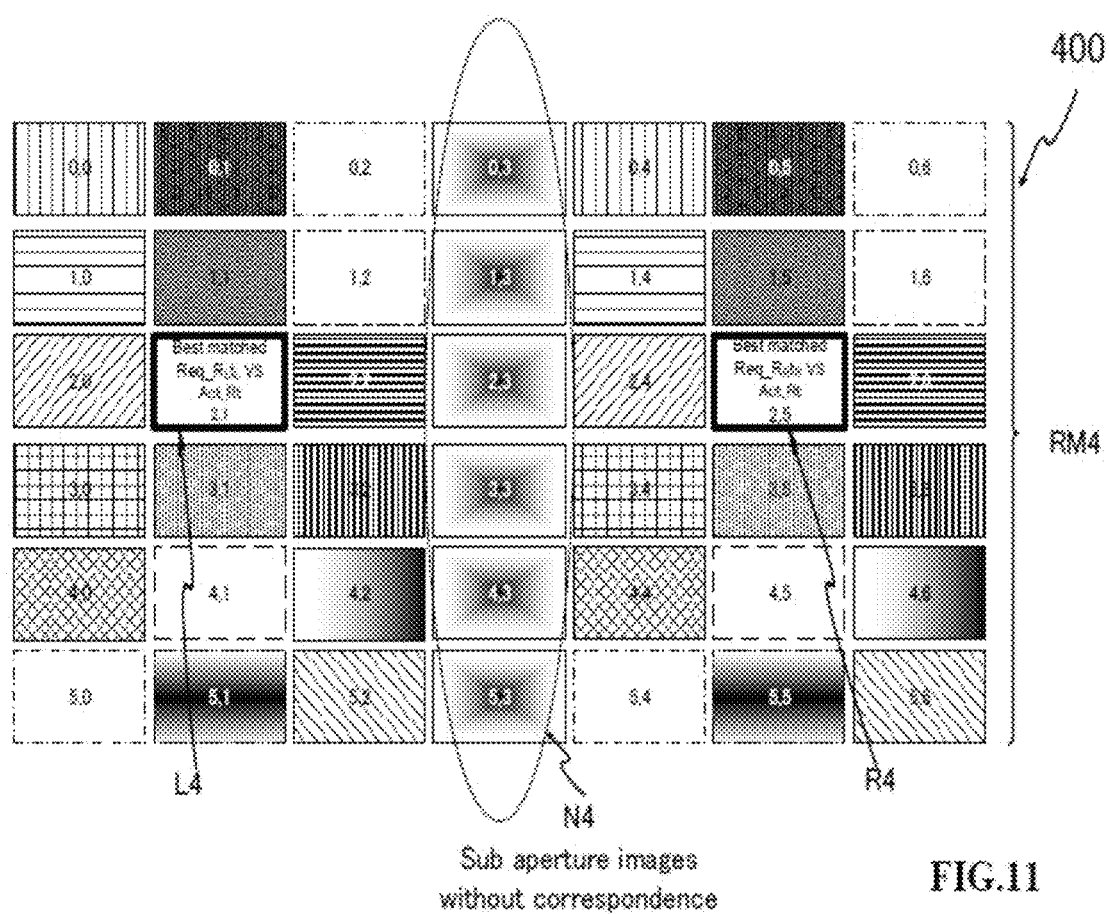
FIG. 11 shows an exemplary embodiment of associating sub aperture images when single lightfield camera is used for creating stereo pair according to an embodiment of present disclosure.

FIG. 11 shows an exemplary embodiment of associating sub aperture images when single lightfield camera is used for creating stereo pair according to an embodiment of present disclosure. This exemplary embodiment will be applied to the case where lightfield camera has many microlenses (and relatively bigger size of sensor plane) and creates many sub aperture images 400 with different views enough to find a stereo pair from sub aperture images taken by single lightfield camera.

In an alternate embodiment, the parameter analysis unit 33 may determine that L4 (u, v)=(2,1) in FIG. 11 is the best matching sub aperture image for left view by comparing required camera parameter for left view 41 (Req_$R_L t_L$) with respective actual camera parameters for respective sub aperture images 400. The Parameter analysis unit 33 may also determine that R4 (u, v)=(2,5) in FIG. 11 is the best matching sub aperture image for right view by comparing required camera parameter for right view 42 (Req_$R_R t_R$) with respective actual camera parameters for respective sub aperture images 400.

Based on the (matching) result, the view associating unit 34 associate remaining sub aperture images RM4 in accordance with the best matching sub aperture image for left view L4 and best matching sub aperture image for right view R4. As illustrated in FIG. 11, there may be sub aperture images without correspondence (N4 in FIG. 11). In FIG. 11, the associated sub aperture images are illustrated with the same filling type. Remaining sub aperture images RM4 refers to all the sub aperture images other than the best matching sub aperture images.

Figure 12:
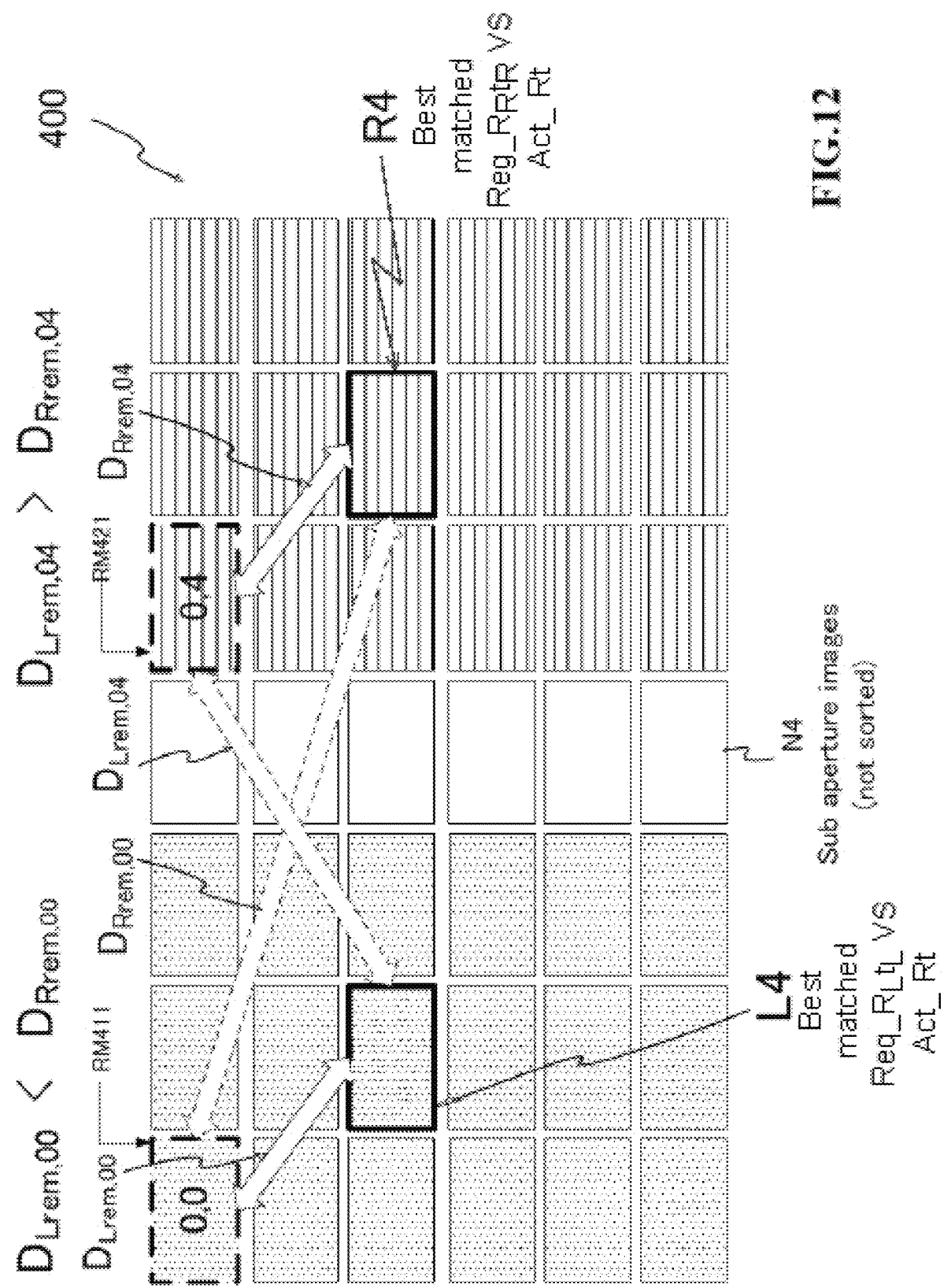
FIG. 12 shows an exemplary embodiment sorting sub aperture images into different classes when a single lightfield camera is used according to an embodiment of the present disclosure.

FIG. 12 shows an example of a sorting technique, where each sub aperture image is divided into two classes, one class being that of the remaining sub aperture image for left view and the second class being the remaining sub aperture image for right view, in case of single lightfield camera is used according to an embodiment of present disclosure. In case of 1 lightfield camera is being used, each sub aperture images 400 has to be sorted in consideration of the distance between actual camera parameter of (u, v)-th remaining sub aperture image (Act_$R_{Rrem,uv} t_{Rrem,uv}$) and actual camera parameter of best matching sub aperture image for left view L4 (Act_$R_{Lbest} t_{Lbest}$) and difference between actual camera parameter of (u, v)-th remaining sub aperture image (Act_$R_{Rrem,uv} t_{Rrem,uv}$) and actual camera parameter of best matching sub aperture image for right view R4 (Act_$R_{Rbest} t_{Rbest}$). In FIG. 12, remaining sub aperture images sorted to remaining sub aperture image for left view RM411 are denoted with dot fill type, while remaining sub aperture images sotted to remaining sub aperture image for right view RM421 are denoted with border fill type. In FIG. 12, remaining sub aperture image (0,0) may be sorted to sub aperture image for left view RM411 in consideration of $D_{Lrem,00} < D_{Rrem,00}$, whereas remaining sub aperture image (0,4) may be sorted to sub aperture image for right view RM421 in consideration of $D_{Lrem,04} > D_{Rrem,04}$.

Figure 13:
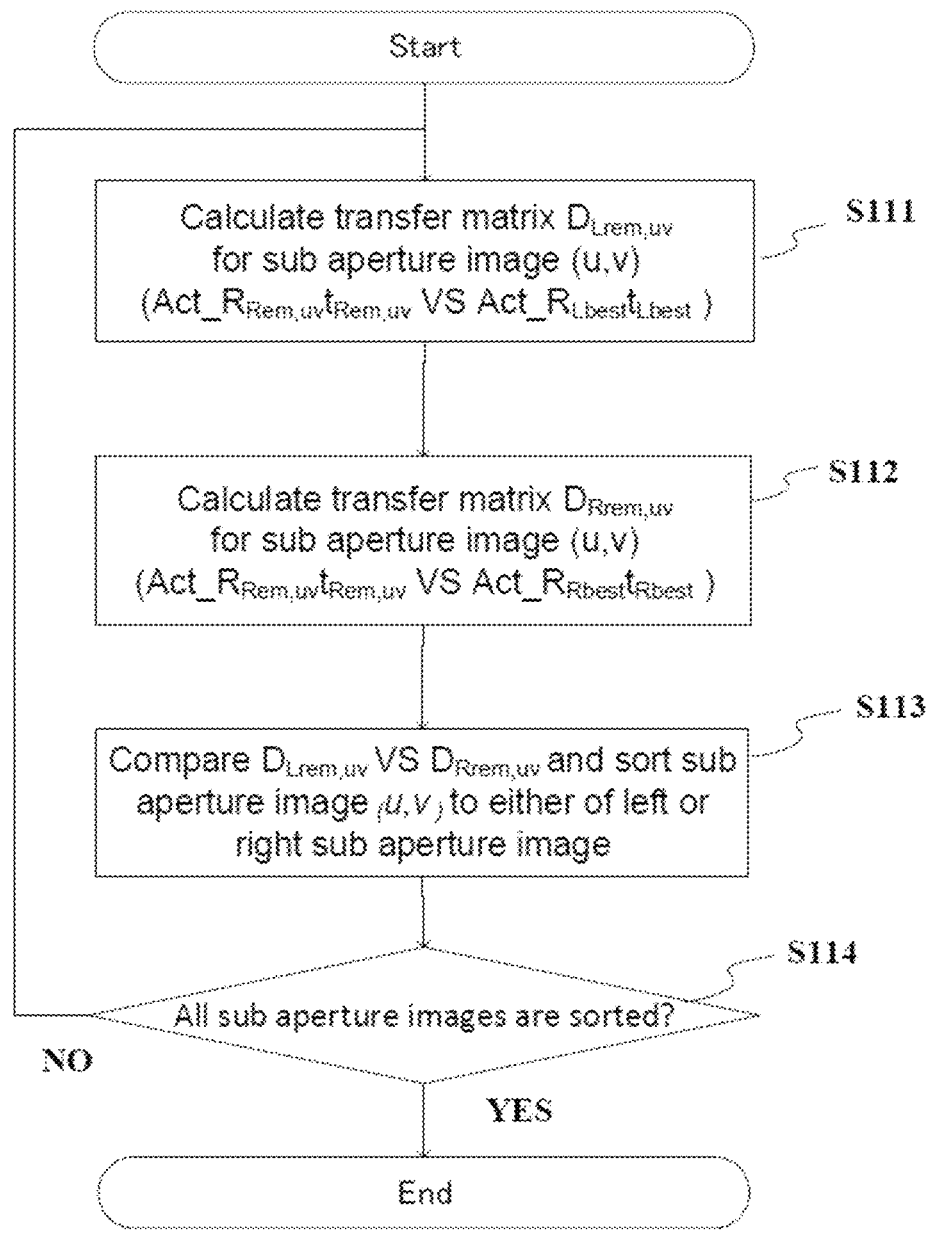
FIG. 13 shows a flow chart illustration for sorting of sub aperture images using a single lightfield camera according to an embodiment of the present disclosure.

FIG. 13 shows a flow chart illustration for sorting respective sub aperture images to remaining sub aperture image for left view or remaining sub aperture image for right view using a single lightfield camera according to an embodiment of present disclosure.

At step S111, for (u, v)-th remaining sub aperture image, view associating unit 34 calculate transfer matrix $D_{Lrem,uv}$ representing transfer matrix between actual camera parameters Act_$R_{Rrem,uv} t_{Rrem,uv}$ of (u, v)-th remaining sub aperture image and actual camera parameters Act_$R_{Lbest} t_{Lbest}$ of the above mentioned best matching sub aperture image for left view L4.

At step S112, for (u, v)-th remaining sub aperture image, view associating unit 34 calculates the transfer matrix $D_{Rrem,uv}$ representing transfer matrix between actual camera parameters Act_$R_{Rrem,uv} t_{Rrem,uv}$ of (u, v)-th remaining sub aperture image and actual camera parameters Act_$R_{Rbest} t_{Rbest}$ of the above mentioned best matching sub aperture image for right view R4.

At step S113, view associating unit 34 compares $D_{Lrem,uv}$ and $D_{Rrem,uv}$ of (u, v)-th remaining sub aperture image then determines (u, v)-th remaining sub aperture image belongs to either of remaining sub aperture image for left view 411 or remaining sub aperture image for right view 421. For example, In case it is determined as $D_{Lrem,uv} < D_{Rrem,uv}$, this (u, v)-th remaining sub aperture image is determined to be belongs to remaining sub aperture image for left view RM411. In case it is determined as $D_{Lrem} = D_{Rrem}$, this (u, v)-th remaining sub aperture image may be registered as without correspondence.

For example, the case $D_{Lrem} < D_{Rrem}$ can be checked by verifying $|R_{LDrem} e + t_{LDrem}| < |R_{Rrem} e + t_{RDrem}|$ with e being a three-dimensional test vector, for example $e^T = (1\ 1\ 1)$. In another example, the case $D_{Lrem} < D_{Rrem}$ can be checked by verifying $|R_{LDrem}| < |R_{RDrem}| \cap |t_{LDrem}| < |t_{RDrem}|$. In this latter example, cases may occur where neither $D_{Lrem} < D_{Rrem}$ nor $D_{Lrem} < D_{Rrem}$ is true. Those sub-aperture images will not be used for further processing.

At step S114, view associating unit 34 determines whether all sub aperture images are sorted. If this is not the last sub aperture image to be sorted, process goes back to step S111 otherwise process will end.

After sorting all remaining sub aperture images to sub aperture images for left or for right view, the above mentioned step 11 to step 18 can be performed for association. These are just an exemplary flowchart. The order of the calculation and process flow does not have to be limited to this example.

According to a an embodiment of the present disclosure, respective actual parameters of respective sub aperture images are compared with required camera parameter for left view or right view. Required camera parameter for left view and right view are theoretical and ideal camera parameters for stereo image pairs. According to present disclosure, sub aperture images may be associated to each other in consideration of the relationship between actual parameter of each sub aperture images and required camera parameter for left or right views.

Naturally, the present disclosure is not limited to the embodiments previously described.

In particular, the present disclosure is not limited to a lightfield camera but also extends to the method of controlling and/or calibrating the same and to the hardware circuitry implementing the controlling/calibration method.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

In view of the above, the foregoing merely illustrates the principles of the present disclosure and it will thus be appreciated that those skilled in the art will be able to devise numerous alternative arrangements which, although not explicitly described herein, embody the principles of the present disclosure and are within its spirit and scope. It is therefore to be understood that numerous modifications may be made to the illustrative embodiments and that other arrangements may be devised without departing from the scope of the present principles.

The invention claimed is:

1. A method for creating a pair of stereoscopic images using at least one lightfield camera, comprising:
receiving, from a source, a respective theoretical lightfield camera parameter for a left view and a right view, wherein the theoretical lightfield camera parameter defines a theoretical stereo image pair;
obtaining images captured by the at least one lightfield camera;
acquiring, based on the images captured by the at least one lightfield camera, respective actual lightfield camera parameters for respective sub aperture images generated from the images captured by the at least one lightfield camera;
determining a best matching sub aperture image for the left view by comparing the theoretical lightfield camera parameter for the left view with the actual lightfield camera parameters for the respective sub aperture images and a best matching sub aperture image for the right view by comparing the theoretical lightfield camera parameter for the right view with the actual lightfield camera parameters for the respective sub aperture images; and
associating the best matching sub aperture image for the left view and the best matching sub aperture image for the right view to create the pair of stereoscopic images, wherein the actual lightfield camera parameter of the determined best matching sub aperture image for the left view has a closest value to the theoretical lightfield camera parameter for left view and the actual lightfield camera parameter of the determined best matching sub aperture image for right view has a closest value to the theoretical lightfield camera parameter for the right view.

2. The method according to claim 1, wherein the actual lightfield camera parameter for the sub aperture image is estimated by:
receiving an image of an object within a scene in the image captured by the at least one lightfield camera and acquiring scene-world-coordinates of respective feature points of the object;
generating a plurality of sub aperture images from the received image of the object;
estimating the actual lightfield camera parameters based on the scene-world-coordinates of respective feature points of the object and corresponding pixel coordinates of the scene-world-coordinates of respective feature points in the sub aperture image.

3. The method according to claim 1, wherein the actual lightfield camera parameter and the theoretical lightfield camera parameter comprises a rotation matrix R and a translation vector t, respectively.

4. The method according to claim 1, wherein the at least one lightfield camera includes a lightfield camera for left view and a lightfield camera for right view, the determining further includes:
determining the best matching sub aperture image for left view by comparing the theoretical lightfield camera parameter for left view with the respective actual lightfield camera parameters for respective sub aperture images generated based on the image captured by the lightfield camera for left view; and
determining the best matching sub aperture image for right view by comparing the theoretical lightfield camera parameter for right view with the respective actual lightfield camera parameters for respective sub aperture images generated based on the image captured by the lightfield camera for right view.

5. The method according to claim 1, wherein the associating further comprises:
calculating a transfer matrix $D_{Lrem}$ able to transfer the actual lightfield camera parameter of a remaining sub aperture image for left view into the actual lightfield camera parameter of the best matching sub aperture image for left view, wherein the $D_{Lrem}$ is calculated for respective sub aperture images for left view;
calculating a transfer matrix $D_{Rrem}$ able to transfer the actual lightfield camera parameter of a remaining sub aperture image for right view into the actual lightfield camera parameter of the best matching sub aperture image for right view, wherein the $D_{Rrem}$ is calculated for respective sub aperture images for right view; and
associating the remaining sub aperture image for left view to the remaining sub aperture image for right view of which $D_{Rrem}$ has the closest value to $D_{Lrem}$,
wherein the remaining sub aperture images are sub aperture images other than the best matching sub aperture images.

6. The method according to claim 1, further comprising:
sorting a remaining sub aperture image other than the best matching sub aperture image either to remaining sub aperture image for left view or remaining sub aperture image for right view, the sorting comprising:
calculating a $D_{Lrem}$ able to transfer the actual lightfield camera parameter of the remaining sub aperture image into the actual lightfield camera parameter of the best matching sub aperture image for left view;
calculating a $D_{Rrem}$ able to transfer the actual lightfield camera parameter of the remaining sub aperture image into the actual lightfield camera parameter of the best matching sub aperture image for right view; and
comparing $D_{Lrem}$ and $D_{Rrem}$ and sorting the remaining sub aperture image to the remaining sub aperture image for left view if $D_{Lrem}$ is smaller than $D_{Rrem}$, otherwise sorting to the remaining sub aperture image for right view.

7. The method according to claim 6, further comprising:
comparing $D_{Lrem}$ and $D_{Rrem}$ and if $D_{Lrem}$ is equivalent to $D_{Rrem}$, sorting neither to the remaining sub aperture image for left view nor to the remaining sub aperture image for right view.

8. The method according to claim 6, further comprising:
associating the remaining sub aperture image sorted to the remaining sub aperture image for left view to the remaining sub aperture image sorted to the remaining sub aperture image for right view of which $D_{Rrem}$ has the closest value to $D_{L_{rem}}$ of the remaining sub aperture image sorted to the remaining sub aperture image for left view.

9. A device for creating a pair of stereoscopic images comprising a processor configured to:
receive, from a source, a respective theoretical lightfield camera parameter for a left view and a right view, wherein the theoretical lightfield camera parameter defines a theoretical stereo image pair;
obtain, based on images captured by at least one lightfield camera, respective actual lightfield camera parameters for respective sub aperture images generated from images captured by the at least one lightfield camera;
determine a best matching sub aperture image for the left view by comparing the theoretical lightfield camera parameter for the left view with the actual lightfield camera parameters for the respective sub aperture images and a best matching sub aperture image for the right view by comparing the theoretical lightfield camera parameter for the right view with the actual lightfield camera parameters for the respective sub aperture images; and
associate the best matching sub aperture image for the left view and the best matching sub aperture image for the right view to create the pair of stereoscopic images, wherein the actual lightfield camera parameter of the determined best matching sub aperture image for the left view has a closest value to the theoretical lightfield camera parameter for left view and the actual lightfield camera parameter of the determined best matching sub aperture image for right view has a closest value to the theoretical lightfield camera parameter for the right view.

10. The device according to claim 9, wherein the actual lightfield camera parameter for the sub aperture image is estimated by:
receiving an image of an object within a scene captured by the at least one lightfield camera and acquiring scene-world-coordinates of respective feature points of the object;
generating a plurality of sub aperture images from the received image of the object;
estimating the actual lightfield camera parameter based on the scene-world-coordinates of respective feature points of the object and corresponding pixel coordinates of the scene-world-coordinates of respective feature points in the sub aperture image.

11. Computer program product downloadable from a communication network and recorded on a non-transitory medium readable by a computer and executable by a processor of the computer, comprising program code instructions for
receiving, from a source, a respective theoretical lightfield camera parameter for a left view and a right view, wherein the theoretical lightfield camera parameter defines a theoretical stereo image pair;
obtaining images captured by at least one lightfield camera;
acquiring, based on the images captured by the at least one lightfield camera, respective actual lightfield camera parameters for respective sub aperture images generated from the images captured by the lightfield camera;
determining a best matching sub aperture image for the left view by comparing the theoretical lightfield camera parameter for the left view with the actual lightfield camera parameters for the respective sub aperture images and a best matching sub aperture image for the right view by comparing the theoretical lightfield camera parameter for the right view with the actual lightfield camera parameters for the respective sub aperture images; and
associating the best matching sub aperture image for the left view and the best matching sub aperture image for the right view to create the pair of stereoscopic images, wherein the actual lightfield camera parameter of the determined best matching sub aperture image for the left view has a closest value to the theoretical lightfield camera parameter for left view and the actual lightfield camera parameter of the determined best matching sub aperture image for right view has a closest value to the theoretical lightfield camera parameter for the right view.

12. Non-transitory computer-readable medium comprising a computer program product recorded thereon and capable of being run by a processor, including program code instructions for receiving, from a source, a respective theoretical lightfield camera parameter for a left view and a right view, wherein the theoretical lightfield camera parameter defines a theoretical stereo image pair;
obtaining images captured by at least one lightfield camera;
acquiring, based on the images captured by the at least one lightfield camera, respective actual lightfield camera parameters for respective sub aperture images generated from the images captured by the lightfield camera;
determining a best matching sub aperture image for the left view by comparing the theoretical lightfield camera parameter for the left view with the actual lightfield camera parameters for the respective sub aperture images and a best matching sub aperture image for the right view by comparing the theoretical lightfield camera parameter for the right view with the actual lightfield camera parameters for the respective sub aperture images; and
associating the best matching sub aperture image for the left view and the best matching sub aperture image for the right view to create the pair of stereoscopic images, wherein the actual lightfield camera parameter of the determined best matching sub aperture image for the left view has a closest value to the theoretical lightfield camera parameter for left view and the actual lightfield camera parameter of the determined best matching sub aperture image for right view has a closest value to the theoretical lightfield camera parameter for the right view.

* * * * *